United States Patent [19]

Rönnhult et al.

[11] 3,977,734
[45] Aug. 31, 1976

[54] VALVE UNIT FOR BRAKING PRESSURE CONTROL IN WHEELED VEHICLES

[75] Inventors: John Fritiof Rönnhult; Ernst Göran Estmar, both of Sodertalje; Bjarne Louis Petersen, Jarna, all of Sweden

[73] Assignee: Saab-Scania Aktiebolag, Sodertalje, Sweden

[22] Filed: Apr. 17, 1975

[21] Appl. No.: 568,810

[30] Foreign Application Priority Data

Apr. 22, 1974 Sweden .......................... 7405366

[52] U.S. Cl. ........................... 303/21 F; 137/627.5; 303/40; 303/61; 303/68
[51] Int. Cl.² ................... B60T 8/06; B60T 15/02
[58] Field of Search ........... 303/21 F, 40, 61–63, 303/68–69; 188/181 A; 137/627.5; 251/30

[56] References Cited
UNITED STATES PATENTS

| | | | |
|---|---|---|---|
| 3,549,212 | 12/1970 | Leiber | 303/21 F |
| 3,743,362 | 7/1973 | Neisch | 303/21 F |
| 3,768,519 | 10/1973 | Morse | 303/21 F X |
| 3,768,875 | 10/1973 | Davis et al. | 303/21 F |
| 3,823,987 | 7/1974 | Kurichh | 303/21 F |
| 3,844,623 | 10/1974 | Parsons et al. | 303/21 F |
| 3,866,982 | 2/1975 | Geier et al. | 303/21 F |
| 3,881,779 | 5/1975 | Machek | 303/21 F |

*Primary Examiner*—Stephen G. Kunin
*Assistant Examiner*—Douglas C. Butler
*Attorney, Agent, or Firm*—Ostrolenk, Faber, Gerb & Soffen

[57] ABSTRACT

A valve unit for controlling air flow and braking pressure in the brake cylinder of a pneumatic braking system. The valve unit has an inlet and an outlet valve assembly each of which are controlled by a solenoid valve, which is in turn controlled by an electronic braking control system. In the inlet valve assembly there is a valve diaphragm which on one side is biased by one pressure to close the valve unit, and which on the opposite side is biased by two pressures to open the valve unit. The ratio between the areas affected by the respective pressures is selected in such a way that the brake cylinder pressure is raised in essentially constant steps.

9 Claims, 10 Drawing Figures

VALVE UNIT FOR BRAKING PRESSURE CONTROL IN WHEELED VEHICLES

BACKGROUND OF THE INVENTION

The present invention relates to a valve unit for controlling braking pressure in at least one brake cylinder in a pneumatic braking system for wheeled vehicles, the valve unit being mounted in a conduit between a compressed air container and the brake cylinder, and comprising an inlet valve and an outlet valve which, under the action of at least one solenoid valve or the like are regulated by information signals from an electronic braking control system to regulate the air flow to and from the brake cylinder, said valve unit, during a pressure increase sequence being fed with pulses of constant length, thereby causing a stepwise pressure increase in the brake cylinder by opening and closing the inlet valve, said inlet valve comprising a regulating chamber which is delimited by a valve means and which is selectively in communication with either the valve unit inlet or with valve unit outlet to the ambient atmosphere.

The valve unit is regulated by an electronic unit incorporated in the braking control system. During a braking operation the electronic unit gives signals to the valve unit for raising, lowering or maintaining constant the braking pressure in the brake cylinder in question. The signals from the electronic unit are dependent on certain critical slip, retardation or acceleration values. It is important for the function of the system that the signals to the valve unit cause well-defined pressure alterations, particularly in regard to pressure increases, independent of whether the alteration is in conjunction with a high or low pressure in the brake cylinder. In other words, a major objective of the invention is the ability to cause a constant pressure increase in the brake cylinder for every pressure raising signal applied to the valve unit.

In regulating systems for pneumatic braking systems, a rise in pressure takes place quicker at lower pressure than at a higher pressure. Opening the inlet valve during a constant short period of time for increasing the brake cylinder pressure therefore gives a considerably larger pressure increase at low pressure in the brake cylinder than at a higher pressure. It is known to attempt the solution of this problem by introducing into the valve a pressure sensitive constriction which causes slower pressure rise at lower pressures in the braking cylinder, while pressure rises at higher pressures are not affected thereby. However, this causes the pressure raising steps to diminish successively during the later phase of the filling cycle. The introduction of such a pressure sensitive constriction in a valve unit also means added complication and an increase in cost of the braking control system in its entirety.

BRIEF DESCRIPTION OF THE INVENTION

The present invention has the object of eliminating said disadvantages, and relates to a valve unit which, without pressure sensitive constrictions, provides equally large pressure alteration steps at each regulating signal, independent of the initial value of the pressure to be altered.

The valve unit according to the invention is distinguished in that the valve means of the inlet valve is biased on one side by the regulating chamber pressure to seal against a valve seat to close the valve, and is biased on the opposite side by both the inlet pressure and the brake cylinder pressure to open the valve, the ratio between the areas affected by the respective pressures being selected in such a way that the inlet valve raises the brake cylinder pressure in essentially constant steps, independently of the initial value of the pressure to be changed.

According to an advantageous embodiment the inlet pressure affects the valve means over an area which is less than a third of the area over which the brake cylinder pressure affects the valve means.

According to another advantageous embodiment the inlet pressure actuates the valve means of the inlet valve over a substantially circular area, the brake cylinder pressure actuating said valve means over an annular area concentrically surrounding the first-mentioned area.

According to still another advantageous embodiment the valve means in the inlet valve and in the outlet valve, respectively, is a diaphragm, the diaphragm in the inlet valve being provided with a draining hole. Advantageously, the diaphragms for the inlet valve and the outlet valve are made as a unit.

According to yet another advantageous embodiment a portion of said diaphragm unit abuts a fixed supporting means arranged in the valve housing between the inlet valve and the outlet valve, said portion of the diaphragm unit and said support means each being provided with a channel, through which a pressure chamber in the outlet valve can communicate with the brake cylinder.

BRIEF DESCRIPTION OF THE FIGURES

An embodiment of the invention will now be described below while referring to the accompanying drawings, in which.

DETAILED DESCRIPTION OF THE INVENTION

Figure 1:
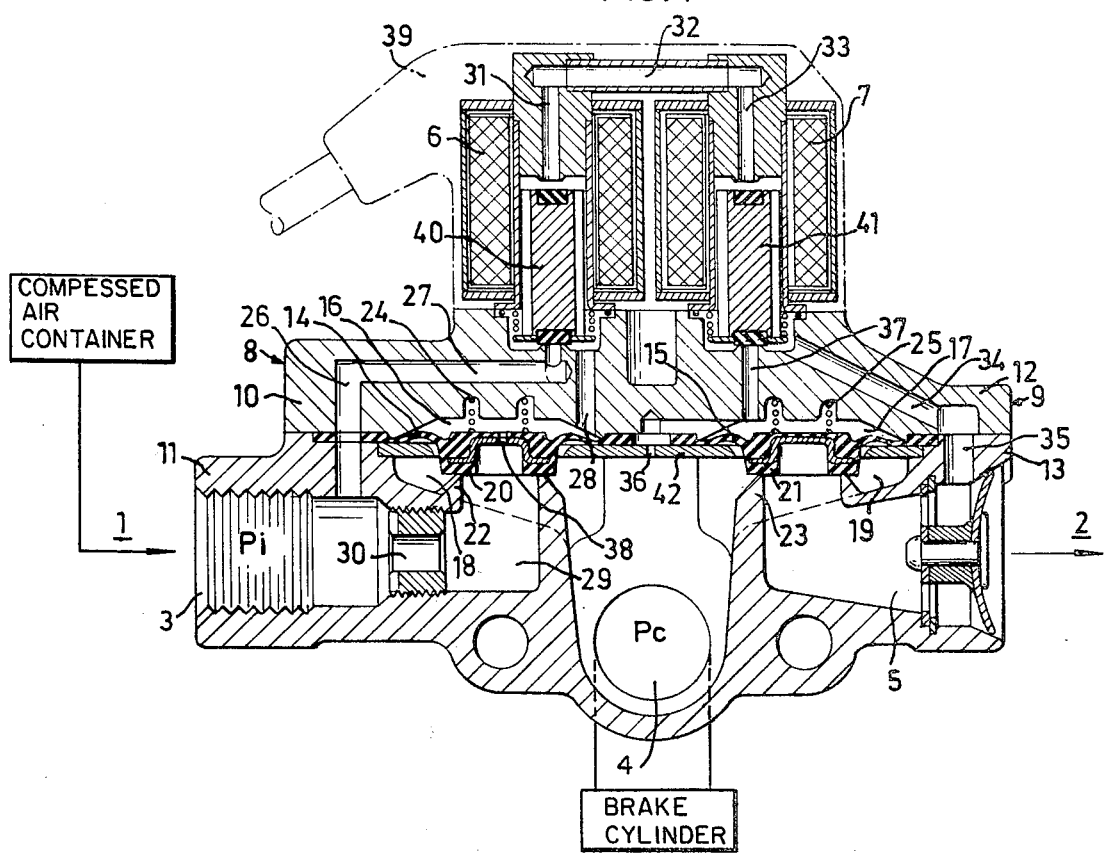
FIG. 1 shows in a sectional side view the construction in principle of a valve unit.

The valve unit according to the invention comprises an inlet valve 1 and an outlet valve 2. The actual valve function for the inlet valve 1 is arranged in a passage between an inlet 3 and a connecting opening 4 to a brake cylinder (shown in simplified fashion). The inlet 3 is supplied with brake pressure medium from a compressed air container (shown in simplified fashion) via a brake control valve (not shown), and when the valve is open, brake pressure medium is transferred via the connecting opening 4 to the brake cylinder in question. The valve function for the outlet valve 2 is arranged in a passage between the connecting opening 4 and an outlet 5 to the surrounding atmosphere.

Both the inlet valve 1 and the outlet valve 2 comprise pressure actuated diaphragm valve assemblies, the shift of which between open and closed position is mainly controlled by solenoid valves 6 and 7 respectively in response to regulating signals from an electronic unit (not shown) incorporated in an electronic braking control system. The inlet valve 1 and the outlet valve 2 respectively surround a diaphragm 14 and 15 in their respective valve housings 8 and 9, which respectively consist of upper portions 10, 12 and lower portions 11, 13, between which the diaphragms 14 and 15 acting as valves are secured. Regulating chambers 16, 17 are respectively formed between the diaphragms 14, 15 and the upper portions 10, 12 in the respective valves 1, 2 and an annular valve chamber 18, 19 is formed between each diaphragm 14, 15 and its respective lower portion 11, 13. Each diaphragm 14, 15 has a bead 20, 21 constituting a sealing body against an annular valve seat 22, 23 in the lower portions 11, 13 of the respective valves 1, 2. The diaphragms 14, 15 are pressed into contact with the respective valve seats 22, 23 by means of pressure springs 24, 25, respectively, mounted in the upper portions 10, 12 of the respective valves 1, 2. The bias of said springs 24, 25 is counteracted on valve opening by a pressure difference in the air pressure on either side of the respective diaphragm 14, 15.

The two solenoid valves 6, 7 are mounted in a common solenoid valve block 39 secured to the inlet and outlet valve upper portions 10, 12 respectively. The solenoid valves 6, 7 each contain an electrically conducting coil, which on connection and disconnection actuates a core shaped as a piston 40, 41 to axial displacing movements in a conventional manner. The pistons 40, 41 in the respective solenoid valves 6, 7 are arranged to seal against either the outlet of an upper channel 31, 33 or the outlet of a lower channel 27, 37. In the deenergized state of the solenoid valves 6, 7 the pistons 40, 41 are caused by pressure springs to assume their respective lower positions. The lower channel 27 from the solenoid valve 6 is connected via a channel 26 with the inlet 3 and the lower canal 37 from solenoid valve 7 opens into the regulating chamber 17. The upper channels 31, 33 are united with each other via a channel 32.

The regulating chamber 16 of the inlet valve 1 has communication via a channel 28 with the cylinder of the solenoid valve 6, whereby the regulating chamber 16 can obtain communication with the inlet 3 through the channels 26, 27 and 28. On the other side of diaphragm 14 there is an inlet chamber 29 in communication with the inlet 3 via a channel 30 which is provided with a constriction. This means that the pressure in the regulating chamber 16 can be affected by the braking medium pressure ahead of the constriction and that the pressure in the inlet chamber 29 is influenced by the braking medium pressure after the constriction.

The regulating chamber 16 is, via said channels 28, 31, 32, 33 and a channel connection 34, 35 from the solenoid valve 7, connected with the outlet 5, the connection with the outlet being closable by means of solenoid valve functions. For draining the regulating chamber 16, the sealing body 20 of the diaphragm 14 is provided with a drain hole 38 for ensuring good function of the valve enven over and extensive period. The regulating chamber 17 of the outlet valve 2 is in communication by a channel 36, with the connecting opening 4. The chamber 17 is also connected with the outlet 5 through the channels 37, 34, 35, the connection being closable by means of solenoid valve functions.

In the starting position, the solenoid valves 6 and 7 are deenergized, the pistons 40, 41 in the respective valves assuming a lower position in accordance with FIG. 1. Since the regulating chamber 16 of the inlet valve 1 is then connected with the atmosphere through the canals 28, 31, 32, 33, 34 and 35, the diaphragm valve 20, 22 will open as soon as the pressure in the inlet chamber 29 gives rise to a force on the diaphragm 14 overcoming the bias from the spring 24. At the outlet valve 2, the spring 25 and the air pressure built up in the regulating chamber 17 through the channel 36 cause the diaphragm valve 21, 23 to be kept closed.

When the braking control system goes into operation, either the solenoid valve 6 or both solenoid valves 6 and 7 are activated. Activation depends on which one or ones of the limit values for slip, retardation and acceleration calculated by the electronic unit in the braking control system is exceeded during braking. Current supply to both solenoid valves 6 and 7 causes both the pistons 40, 41 to assume an upper position, whereat the regulating chamber 16 is connected with the inlet 3 via the channels 26, 27 and 28, and the regulating chamber 17 at the outlet valve 2 is connected with the outlet 5 via the channels 37, 34 and 35. This means that the pressure in the regulating chamber 16 closes the inlet valve 1 and that the outlet valve 2 opens under the influence of brake cylinder pressure, so that a pressure drop occurs in the brake cylinder.

Current supply solely to the solenoid valve 6 causes the piston 40 to assume its upper position, while the piston 41 in the solenoid valve 7 still remains in its lower position. The regulating chamber 16 is then connected with the inlet 3 and the regulating chamber 17 is connected with the connecting opening 4, which means that both the inlet valve 1 and the outlet valve 2 are closed, and that the pressure in the brake cylinder is kept constant.

A break in the current supply to both the solenoid valves 6 and 7 causes a pressure increase in the brake cylinder. In the controlling system this is achieved by pulsed short breaks in the current supply to the solenoid valve 6 simultaneously as the solenoid 7 is maintained deenergized during the entire pressure raising cycle. The outlet valve 2 is thereby closed when the regulating chamber 16 is put in communication with the outlet 5 on changing the state of the solenoid valve 6. During a certain period of time, determined by the length of the break in current supply, the inlet valve 1 is open simultaneously as the outlet valve 2 is closed, whereat the pressure in the brake cylinder increases.

Figure 2:
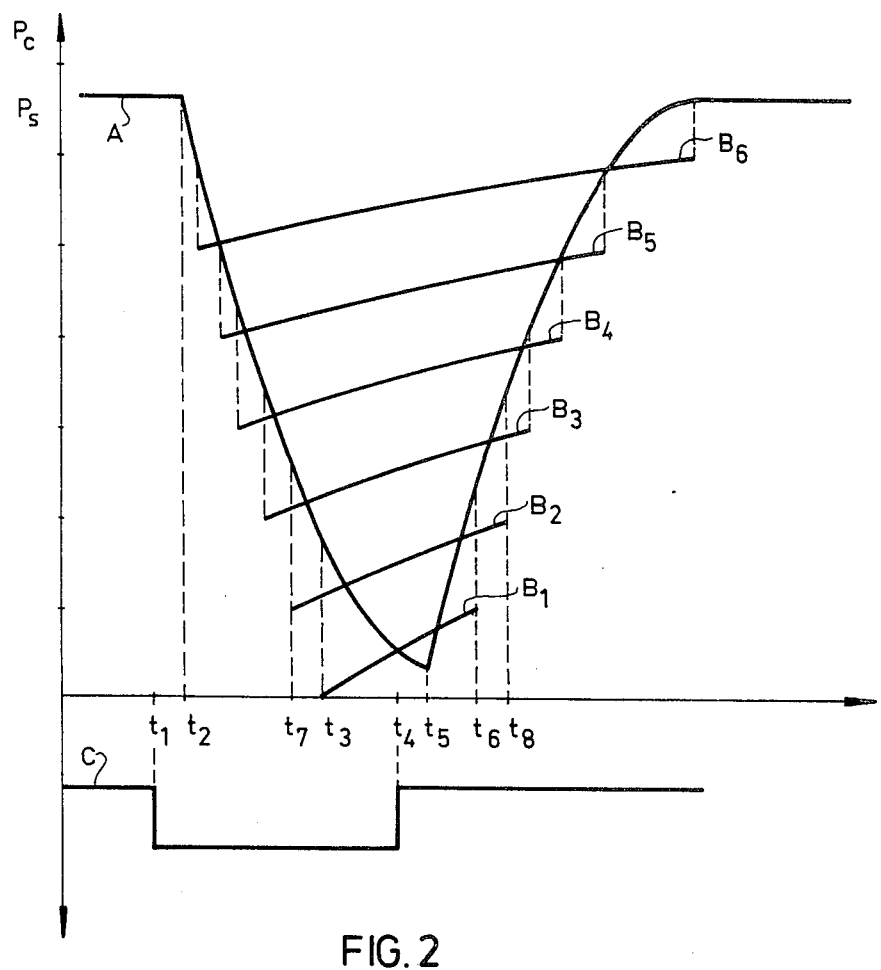

A graph C in FIG. 2 illustrates a break in current supply to the solenoid valve 6 and a graph A shows how the pressure $p_s$ in the regulating chamber 16 during a pressure raising cycle is caused to vary by such a break pulse. The curves $B_{1-6}$ illustrate the pressure increase which each such break pulse initiates in the brake cylinder, dependent on the initial pressure in the brake cylinder 4. The first break pulse after a pressure reduction cycle gives a pressure increase according to curve $B_1$, the second break pulse gives a pressure increase according to curve $B_2$, etc. In FIG. 2 the different pressure curves for the brake cylinder are collected together in a diagram together with the graphs A and C which are similar for each pulse break.

It is assumed that during a braking operation the inlet 3 is fed the whole time with braking medium under a maximum pressure $p_i$. In the starting position for a pressure raising cycle the brake cylinder has a low pressure. At time $t_1$ the signal level to the solenoid valve 6 is altered and after a certain delay to time $t_2$ the solenoid valve 6 alters the position of piston to so that the regulating chamber 16 is put in communication with outlet 5, whereat the pressure $p_s$ falls. At time $t_3$ the pressure $p_s$ in the regulating chamber 16 has fallen so low that the inlet pressure $p_i$ and brake cylinder pressure $p_c$ in the inlet chamber 29 and the valve chamber 18, respectively, are capable of opening the valve 20, 22. The pressure $p_c$ in the brake cylinder thereby begins to rise in accordance with curve $B_1$. At time $t_4$ the solenoid valve 6 is once reactivated and after a certain delay to time $t_5$ the initiated change of state of the solenoid valve takes place. The regulating chamber 16 is then connected with the inlet 3 and the pressure $p_s$ increases rapidly. At time $t_6$ the regulating chamber pressure $p_s$ has increased to a level where its force on the diaphragm 14 exceeds the combined forces from the inlet and brake cylinder pressures, thus causing the valve 20, 22 to close. The pressure in the brake cylinder has thereby increased to a level in accordance with the curve $B_1$.

On condition that the pressure raising cycle is not broken off, the pressure thus obtained in the brake cylinder will be the starting pressure for the next subsequent pressure increase in the brake cylinder, this means that the force from the inlet pressure $p_i$ and the then existing brake cylinder pressure $p_c$ will exceed the force from the regulating chamber pressure $p_s$ already at time $t_7$, whereat the valve 20, 22 opens. The valve 20, 22 will furthermore close at a later time $t_8$ than previously, since the regulating chamber pressure $p_s$ will only then attain a force on the diaphragm 14 exceeding the force from the inlet pressure $p_i$ and the brake cylinder pressure $p_c$, further raised during the open time $t_8$–$t_7$. As may be seen from the remaining pressure increase curves $B_3$–$B_6$ in FIG. 2, the valve 20, 22 will be open the longer the higher the starting pressure in the brake cylinder is, whereby the previously mentioned slower pressure increase at higher pressure is compensated. The degree of compensation is dependent partly on the slope of the graph A and partly on where on said graph the time $t_3$ occurs. The slope of graph A may be varied by adjustment of the channel bore to and from the regulating chamber 16, while the position for time $t_3$ on the graph may be affected by the relationship between the areas on which the inlet pressure and the brake cylinder pressure respectively act on the diaphragm 14. The smaller the area the inlet pressure acts on in relation to the area on which the brake cylinder pressure acts, the farther down on the graph comes time $t_3$.

Figure 3:
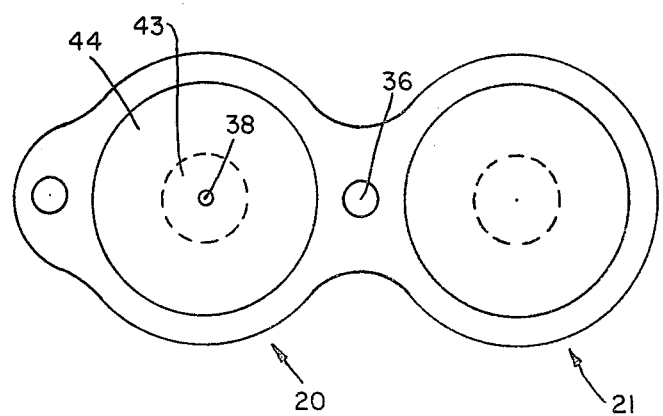
FIG. 2 illustrates in diagrammatic form how the brake pressure is altered as a function of time during a pressure raising cycle and FIG. 3 shows a plan view of a unit incorporating the inlet and outlet valve diaphragms

Certain practical problems limit the possibility of utilizing said controlling means. It is thus only possible to vary the slope of the graph A within narrow limits since the pressure alteration cycles at higher brake cylinder pressure quickly tend to demand open times for the valve 20, 22 which are too long in relation to the time that the solenoid valve 6 is open. This reduces the possibility of attaining rapid pulsing desirable in braking control systems. With regard to this, the previously mentioned area relationship is of great importance for attaining sufficient compensation of the slower pressure increase at higher brake cylinder pressures. Characteristic for the valve unit according to the invention is that the inlet pressure $p_i$ acts on an area 43 (see FIG. 3) falling short of a third of the area 44 on which the brake cylinder pressure $p_c$ acts.

In those cases where the valve 20, 22 is of the diaphragm type, which from the point of view of quickness is advantageous, the possibility of varying said area relationship is however limited. From the operational point of view it has been found favourable to let the inlet pressure work on the central portion 43 of the diaphragm 14 and to let the brake cylinder pressure work on the remaining annular portion 44 facing the regulating chamber 16 behind it. This choice of flow direction is also favourable from the point of view of manufacture, since the lower portion 11 of the valve housing 8 thereby obtains a symmetrical shape.

In an advantageous embodiment (see FIG. 3) of the diaphragms 14, 15 for the inlet valve 1 and the outlet valve 2 respectively, the diaphragms are formed as a unit, clamped between upper portion 10, 12 and lower portion 11, 13 in the valve housing 8, 9. Between the actual diaphragms 14, 15 the diaphragm unit abuts a supporting washer 42 which is mounted in the valve housing, both the diaphragm unit and the supporting washer 42 being provided with a channel passage 36.

The invention is not limited to the embodiment described above, but can be varied and modified in alternative embodiments within the scope of the following claims. Thus, the intended valve effect can be obtained by use of piston valves, and also the direction of flow from the inside to the outside, as described for the inlet valve 1, can be reversed if the inlet chamber 29 and the valve chamber 18 change places.

What we claim is:

1. A valve unit having an inlet and an outlet, said unit being adapted to control braking pressure in at least one brake cylinder in a pneumatic braking system for wheeled vehicles, comprising a compressed air source;
    said valve unit being mounted in a conduit between said compressed air source and said brake cylinder, and comprising at least one solenoid valve means, an inlet valve means and an outlet valve means which, under the action of said solenoid valve means are regulated by signals from an electronic braking control system to regulate the air flow entering and leaving the brake cylinder, said valve unit, during a pressure increase sequence, being fed with pulses of constant length to develop a stepwise pressure increase in the brake cylinder by opening and closing the inlet valve means;
    said inlet valve means comprising a regulating chamber;
    said solenoid valve means being adapted to selectively place said chamber in communication with either the valve unit inlet or with the valve unit outlet to the ambient atmosphere, characterized in that the inlet valve means further includes a diaphragm and a valve seat, said diaphragm being biased by the pressure in the regulating chamber into sealing engagement with the valve seat to close the first valve means, and being biased on the opposite side thereof by both the inlet pressure and the brake cylinder pressure to open said first valve means, the valve seat being adapted to expose a first portion of the diaphragm to inlet pressure and a second portion adjacent said first portion to the brake cylinder pressure, the ratio between the areas of the inlet valve means diaphragm affected by the respective pressures being selected in such a way that the inlet valve means raises the brake cylinder pressure towards the pressure level of said compressed air source in essentially constant steps, independently of the initial value of the pressure to be changed.

2. A valve unit in a pneumatic braking system for wheeled vehicles having at least one brake cylinder, said valve unit having an inlet for receiving compressed air at a predetermined pressure level;
    a first outlet connected to at least one brake cylinder and a second outlet for exhausting the valve unit to the ambient atmosphere, said first outlet being positioned to divide the valve unit into two substantially symmetrical parts with an inlet part and an outlet part with the inlet and the second outlet being on opposite sides of said first outlet, the inlet part comprising inlet valve means for regulating the communication between the inlet and the first outlet;

the outlet part comprising outlet valve means regulating the communication between the first outlet and the second outlet, said inlet valve means and outlet valve means each comprising a regulating chamber, a valve seat and a diaphragm which by a pneumatic pressure in its associated regulating chamber is biased to be sealed against its valve seat to place each of the valve means in a closed state and which diaphragms by a counteractive pneumatic pressure on their opposite sides are biased to open their associated valve means, said opening and closing of each valve means being regulated by means of at least one solenoid valve means which receive signals from an electronic braking control system to regulate pressure in the brake cylinder;

the valve seat of said inlet valve means being designed to cause the brake cylinder pressure to act upon an annular shaped area of the inlet valve means diaphragm, which annular shaped area concentrically surrounds a substantially circular central area of the inlet valve means diaphragm, which circular area is exposed to and biased by the inlet pressure and which is less than one-third of said annular shaped area;

said solenoid valve means being adapted during a brake pressure increase sequence to be fed with pulses of constant length for causing said inlet valve means diaphragm to be selectively alternately connected to said inlet and said second outlet to thereby raise the brake cylinder pressure towards the pressure level at said inlet in essentially constant steps, regardless of the initial value of said brake cylinder pressure.

3. The valve unit of claim 2, characterized in that the diaphragm of said inlet valve means is provided with a draining hole communicating between said inlet and said regulating chamber of the inlet value means.

4. The valve unit of claim 1, characterized in that said diaphragms for the inlet valve means and the outlet valve means are each joined to one another by a central portion to form a composite unit.

5. The valve unit of claim 2, characterized in that the diaphragms of the inlet valve means and the outlet valve means are formed as a unit, said unit having a central portion joining the diaphragms and abutting a fixed supporting means intermediate the diaphragms and arranged in the valve housing between the inlet valve means and the outlet valve means, said diaphragm unit and said supporting means being provided with aligned openings through which the regulating chamber of said outlet valve means communicates with the brake cylinder.

6. A valve unit for controlling the operation of a brake cylinder in wheeled vehicles comprising:

an inlet for receiving compressed air to be selectively delivered to the brake cylinder;

a first exhaust outlet for passing compressed air to the atmosphere, which compressed air is selectively received by the exhaust outlet from the brake cylinder;

the brake cylinder having an opening for selectively communicating with said inlet and said first outlet;

first valve means for selectively coupling said inlet to said brake cylinder opening;

second valve means for selectively coupling said brake cylinder opening to a second outlet;

said first valve means comprising a valve seat and a cooperating movable diaphragm adapted to be lifted away from said valve seat to couple said inlet to said brake cylinder opening;

a regulating chamber and means normally biasing said diaphragm towards sealing engagement with said valve seat;

channel means coupling said inlet to said regulating chamber;

said channel means including solenoid valve means having a valve member normally biased to block said channel means to prevent inlet pressure from entering said regulating chamber through said channel means when in a first state and unblocking said channel means to couple said inlet to said regulating chamber when in a second state;

said second valve means including a second valve seat, a cooperating second diaphragm and a second regulating chamber including means for biasing said second diaphragm into sealing engagement with said second valve seat, said second diaphragm being adapted to be lifted from said second valve seat to couple said first and second outlets;

said first valve seat being adapted to expose a central portion of said first diaphragm to inlet pressure and to expose a surrounding annular portion of the first diaphragm to the brake cylinder pressure, when the first diaphragm sealingly engages the first valve seat;

an area of said surrounding annular portion being substantially greater than the area of said central portion;

said solenoid valve means being adapted to be successively triggered to said second state by a series of triggering pulses of substantially constant length to cause the pressure in the brake cylinder to increase in substantially uniform stepwise increments toward the pressure level at said inlet regardless of the initial value of the brake cylinder pressure upon initiation of a braking sequence.

7. The valve unit of claim 6 further comprising second channel means extending between said first regulating chamber and said first exhaust outlet;

said first solenoid means being adapted to provide communication between said first regulating chamber and said first exhaust outlet when communication between said inlet and said first regulating chamber is blocked, and being adapted to block communication between said first regulating chamber and said first exhaust outlet when communication between said inlet and said first regulating chamber is established.

8. The valve unit of claim 6 further comprising second channel means extending between said second regulating chamber and said first exhaust outlet and including second solenoid valve means normally biased to block communication between said second regulating chamber and said first exhaust outlet and, upon energization, being adapted to establish communication between said second regulating chamber and said first exhaust outlet.

9. The valve unit of claim 8 further comprising third channel means extending between said first and second regulating chambers for providing communication between said first and second chambers when both said first and second solenoid valve means are energized and for blocking communication between said first and second regulating chambers when either of said first and second solenoid valve means are energized.

* * * * *

UNITED STATES PATENT OFFICE
CERTIFICATE OF CORRECTION

Patent No. 3,977,734      Dated August 31, 1976

Inventor(s) John Fritiof Rönnhult; Ernst Göran Estmar; Bjarne Louis Petersen

It is certified that error appears in the above-identified patent and that said Letters Patent are hereby corrected as shown below:

Title page, item [21] "Appln. No.: 568,810" should be -- Appln. No.: 568,840 --;

Figure 1 of the Drawings, the legend "COMPESSED AIR CONTAINER" should be -- COMPRESSED AIR CONTAINER --;

Column 3, line 55, "enven over and" should be -- even over an --

Column 4, line 63, "to" should be -- 40 --.

Signed and Sealed this

Twenty-fifth Day of January 1977

[SEAL]

Attest:

RUTH C. MASON
*Attesting Officer*

C. MARSHALL DANN
*Commissioner of Patents and Trademarks*